(12) United States Patent
Duis et al.

(10) Patent No.: US 9,975,301 B2
(45) Date of Patent: *May 22, 2018

(54) PROCESS FOR MANUFACTURE OF A THERMOCHROMIC CONTACT LENS MATERIAL

(71) Applicant: Johnson & Johnson Vision Care, Inc., Jacksonville, FL (US)

(72) Inventors: Donnie J. Duis, Jacksonville, FL (US); Nayiby Alvarez-Carrigan, St. Johns, FL (US); Holly L. Grammer, Fort Worth, TX (US); Ture Kindt-Larsen, Holte (DK); Frank F. Molock, Jr., Orange Park, FL (US); Jaqunda Patton, Jacksonville, FL (US); Kim Sander Pedersen, Horsholm (DK); Eric R. George, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 580 days.

This patent is subject to a terminal disclaimer.

(21) Appl. No.: 14/501,510

(22) Filed: Sep. 30, 2014

(65) Prior Publication Data

US 2015/0115484 A1    Apr. 30, 2015

Related U.S. Application Data

(63) Continuation of application No. 13/082,517, filed on Apr. 8, 2011, now Pat. No. 8,877,103.
(Continued)

(51) Int. Cl.
*B29D 11/00* (2006.01)
*G02B 1/04* (2006.01)
*B29K 105/00* (2006.01)

(52) U.S. Cl.
CPC .. *B29D 11/00038* (2013.01); *B29D 11/00125* (2013.01); *B29D 11/00134* (2013.01);
(Continued)

(58) Field of Classification Search
CPC ........ B29D 11/00038; B29D 11/00134; B29D 11/00634; B29D 11/00125; B29D 11/00894
See application file for complete search history.

(56) References Cited

U.S. PATENT DOCUMENTS

| 4,495,313 A | 1/1985 | Larsen |
| 4,680,336 A | 7/1987 | Larsen et al. |

(Continued)

FOREIGN PATENT DOCUMENTS

| JP | 2004504474 | 2/2004 |
| JP | 2008536179 | 9/2008 |

(Continued)

OTHER PUBLICATIONS

Crivello, et al, Photoinitiators for Free Radical Cationic & Anionic Photopolymerisation, 2nd Edition, vol. III, pp. 275-298, John Wiley and Sons, New York, 1998.
(Continued)

*Primary Examiner* — Mathieu Vargot
(74) *Attorney, Agent, or Firm* — Raef M. Shaltout

(57) ABSTRACT

Disclosed in this specification is a process for manufacturing a thermochromic contact lens. The process includes (1) selecting a photoinitiator that absorbs at a first wavelength and at least one thermochromic dye that displays substantial absorption at the first wavelength when the dye is at a first temperature and exhibits at least an 80% reduction in absorbance at the first wavelength at a second temperature,
(Continued)

(2) maintaining the reaction mixture at the second temperature and (3) providing cure light that includes the first wavelength.

17 Claims, 11 Drawing Sheets

Related U.S. Application Data

(60) Provisional application No. 61/323,426, filed on Apr. 13, 2010.

(52) U.S. Cl.
CPC .. *B29D 11/00634* (2013.01); *B29D 11/00894* (2013.01); *G02B 1/043* (2013.01); *B29K 2105/0005* (2013.01); *B29K 2105/0032* (2013.01); *B29K 2995/002* (2013.01)

(56) References Cited

U.S. PATENT DOCUMENTS

| | | | |
|---|---|---|---|
| 5,658,376 A | 8/1997 | Noguchi et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,849,811 A | 12/1998 | Nicolson et al. |
| 5,965,631 A | 10/1999 | Nicolson et al. |
| 5,998,498 A | 12/1999 | Vanderlaan et al. |
| 6,087,415 A | 7/2000 | Vanderlaan et al. |
| 6,174,465 B1 | 1/2001 | Buazza et al. |
| 6,337,040 B1 | 1/2002 | Thakrar et al. |
| 6,429,294 B1 | 8/2002 | Masuda et al. |
| 6,864,299 B1 | 3/2005 | Komuro et al. |
| 7,053,169 B2 | 5/2006 | Buhler |
| 7,364,291 B2 | 4/2008 | Haywood et al. |
| 7,553,880 B2 | 6/2009 | Nicolson et al. |
| 7,556,750 B2 | 7/2009 | Xiao et al. |
| 7,560,056 B2 | 7/2009 | Van Gemert et al. |
| 2004/0158028 A1 | 8/2004 | Buhler |
| 2005/0258408 A1 | 11/2005 | Molock et al. |
| 2006/0226401 A1 | 10/2006 | Xiao et al. |
| 2006/0227287 A1 | 10/2006 | Molock et al. |
| 2007/0035050 A1 | 2/2007 | Rogers |
| 2007/0065633 A1 | 3/2007 | Mori et al. |
| 2009/0072206 A1 | 3/2009 | Kim et al. |
| 2009/0244479 A1 | 10/2009 | Zanini et al. |
| 2010/0048847 A1 | 2/2010 | Broad |
| 2010/0149620 A1 | 6/2010 | Knowles et al. |
| 2011/0051223 A1 | 3/2011 | Knowles et al. |
| 2011/0249235 A1 | 10/2011 | Duis et al. |

FOREIGN PATENT DOCUMENTS

| | | |
|---|---|---|
| KR | 20090214445 A | 3/2009 |
| RU | 584529 A1 | 12/1993 |
| WO | 2001040846 A2 | 6/2001 |
| WO | 200208355 A2 | 1/2002 |
| WO | 2003032084 A2 | 4/2003 |
| WO | 2006110306 A1 | 10/2006 |
| WO | 2008061992 A2 | 5/2008 |
| WO | 2011130137 A2 | 10/2011 |
| WO | 2011130139 A1 | 10/2011 |

OTHER PUBLICATIONS

International Preliminary Report on Patentability dated Oct. 16, 2012 for PCT/US2011/031878.
PCT International Search Report, dated Nov. 16, 2011, for PCT Int'l. Appln. No. PCT/US2011/031878.
Demus et al, "Liquid Crystals", New York; Gordon and Breach 1967. Print.
People's Republic China Search Report dated Aug. 2, 2016, for Chinese Patent Appln. No. 201510593314.1.

PROCESS FOR MANUFACTURE OF A THERMOCHROMIC CONTACT LENS MATERIAL

RELATED APPLICATIONS

This application is a continuation of U.S. patent application Ser. No. 13/082,517 filed Apr. 8, 2011, now U.S. Pat. No. 8,877,103, which claims priority to U.S. Provisional Patent Application No. 61/323,426, filed Apr. 13, 2010.

FIELD OF THE INVENTION

This invention relates, in one embodiment, to a process for manufacturing contact lenses comprising at least one thermochromic compound. More particularly, the process relates to a manufacturing process for photocuring polymerizable mixtures in the presence of thermochromic compounds to produce contact lenses comprising thermochromic compounds.

BACKGROUND

Precision spectral filters filter specific wavelengths of visible or UV radiation. This allows for the production of optical articles, such as glasses, which can be tailored to block specific wavelengths of light to produce optical articles for different uses, including the protection of the cornea, lens and retina from specific harmful radiation wavelengths. For example, various sunglasses have been used to protect human eyes from strong light including photochromic glasses, polarized glasses and glasses for specific activities including shooting and fishing. Photochromic spectacles darken upon exposure to certain wavelengths of light and typically exposure to ultraviolet (UV) light and brighten when UV light is removed. Often, such photochromic spectacles include a prescription for vision correction.

Adapting certain technology, including photochromic technology to contact lenses is more difficult than adapting the same technology to spectacles. Additional factors, such an oxygen permeability, comfort and fit of the resulting lens, must be taken into account. The manufacturing process of contact lenses is also more complicated. Typically, contact lenses are formed by irradiating a photoinitiator in the presence of one or more polymerizable materials. In the case of photochromic contact lenses, it is desirable to include the photochromic dye in the reactive mixture containing the photoinitiator and polymerizable materials that, upon polymerization, forms the contact lens. Unfortunately, certain dyes, including photochromic dyes have the potential to interfere with the activation of the photoinitiator.

Polymerizable mixtures may also be cured using other free radical based chain reaction polymerization, including thermal polymerization.

SUMMARY OF THE INVENTION

The invention comprises, in one form thereof, a process for manufacturing contact lenses comprising at least one thermochromic compound. The process includes (1) selecting a photoinitiator that absorbs radiation at a first wavelength and a thermochromic compound that absorbs radiation at the same first wavelength but does not substantially absorb at this wavelength at a second temperature, (2) maintaining the reaction mixture at the second temperature and (3) exposing the reaction mixture to radiation that includes the first wavelength.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION OF A PREFERRED EMBODIMENT

Any chemical name preceded by (meth), for example (meth)acrylate, includes both the unsubstituted and methyl substituted compound.

Fixed light absorbing compounds are compounds which display temperature independent light absorption.

Figure 1:
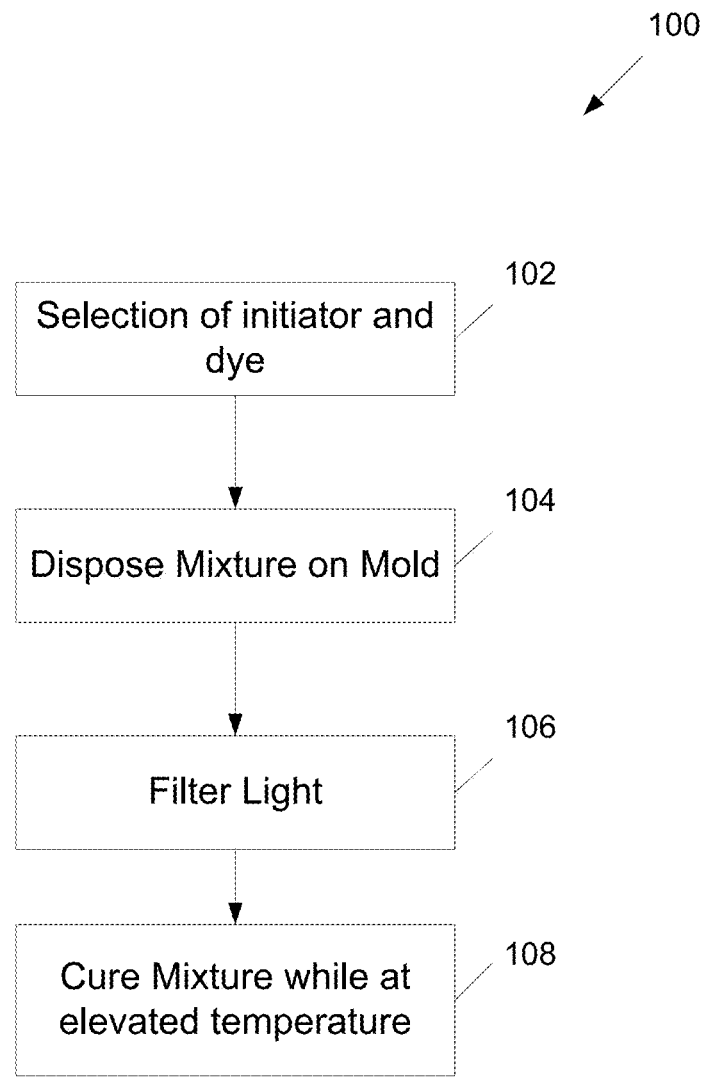
FIG. 1 is a flow diagram depicting one process of the invention.

Referring to FIG. 1, one embodiment of the process, 100 is depicted that begins with step 102 wherein a photoinitiator and a photochromic dye are selected. Although it is theoretically possible to select an initiator/photochromic dye pair that do not have any overlap in their absorption spectra, such pairs are difficult to find for use in contact lenses. In one embodiment, the present invention is directed to initiator/thermochromic compound pairs that both absorb within an overlapping wavelength range at least one temperature. In one embodiment the initiator/dye pair displays overlapping absorbance at least one wavelength within the range of about 380 nm to about 780 nm.

Initiators generate free radicals that can initiate a chemical chain reaction. A photoinitiator is a compound that, upon exposure to certain wavelength of light, generates free radicals that can initiate a chemical chain reaction. In one embodiment, the photoinitiator absorbs within the visible range (about 380 nm to about 780 nm) of the electromagnetic spectrum. Suitable visible light photoinitiators are known in the art and include, but are not limited to aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)- phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). These and other photoinitators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998. The initiator is used in the reaction mixture in effective amounts to initiate photopolymerization of the reaction mixture, e.g., from about 0.1 to about 2 parts by weight per 100 parts of reactive monomer.

In one embodiment visible light photoinitiators include alpha-hydroxy ketones such as Irgacure® (e.g. Irgacure 1700 or 1800) available from CIBA; various organic phosphine oxides, 2,2'-azo-bis-isobutyro-nitrile; diethoxyacetophenone; 1-hydroxycyclohexyl phenyl ketone; 2,2-dimethoxy-2-phenylacetophenone; phenothiazine; diisopropylxanthogen disulfide; benzoin or benzoin derivatives; and the like. In one embodiment, the initiator absorbs light and is activated at wavelengths below about 420 nm.

In another embodiment, thermal initiation is used in place of or in conjunction with photoinitation. Examples of thermal initiators include lauroyl peroxide, benzoyl peroxide, isopropyl percarbonate, azobisisobutyronitrile, mixtures thereof and the like.

Thermochromic compounds are compounds that display temperature dependent light absorption. Thermochromic compounds include compounds such as leuco dyes and liquid crystal particles which are generally used for their temperature dependent changes in light absorption as well as compounds such as photochromic compounds which display changes in the rate or degree to which they absorb light in their activated state.

Examples of thermochromic liquid crystals include cholesteryl nonanoate and cyanobiphenyls. Additional examples are disclosed in "Liquid Crystals", D. Demus and H. Sackman, Gordon and Breach 1967. Examples of leuco dyes include spirolactones, fluorans, spiropyrans, fulgides and combinations thereof. The liquid crystals and leuco dyes may be incorporated into polymerizable mixtures as microcapsules.

Photochromic dye is any compound that is capable of transforming between a first "clear," "bleached" or "unactivated" ground state and a second "colored", darkened or "activated" state in response to the absorption of certain wavelengths of electromagnetic radiation (or "actinic radiation"). In one embodiment, the photochromic dye, when in an activated state, absorbs within the visible range (380 nm to 780 nm) of the electromagnetic spectrum. Examples of suitable photochromic dyes are known in the art and include, without limitation, the following classes of materials: chromenes, such as naphthopyrans, benzopyrans, indenonaphthopyrans and phenanthropyrans; spiropyrans, such as spiro (benzindoline) naphthopyrans, spiro (indoline) benzopyrans, spiro (indoline) naphthopyrans, spiro (indoline) quinopyrans and spiro (indoline) pyrans; oxazines, such as spiro (indoline) naphthoxazines, spiro (indoline) pyridobenzoxazines, spiro (benzindoline) pyridobenzoxazines, spiro (benzindoline) naphthoxazines and spiro (indoline) benzoxazines; mercury dithizonates, fulgides, fulgimides and mixtures of such photochromic compounds.

Additional suitable photochromic dyes include, without limitation, organo-metal dithiozonates, such as (arylazo)-thioformic arylhydrazidates, e.g., mercury dithizonates; and fulgides and fulgimides, naphthoxazines, spirobenzopyrans; polymerizable spirobenzopyrans and spirobenzopyrans; polymerizable fulgides; polymerizable naphtacenediones; polymerizable spirooxazines; and polymerizable polyalkoxylated napthopyrans. The photochromic dyes may be used alone or in combination with one or more other appropriate and complementary photochromic dyes.

Still other useful photochromic dyes include indeno-fused naphthopyrans chosen from an indeno[2',3':3,4]naphtho[1,2-b]pyran and an indeno[1',2':4,3]naphtho[2,1-b]pyran, which are more specifically disclosed in US2009/0072206 and US2006/0226401 and those cited in U.S. Pat. No. 7,364,291, and combinations thereof. Other suitable photochromic compounds are disclosed in U.S. Pat. No. 7,556,750, the disclosure of which is incorporated by reference. Non-limiting examples of suitable photochromic dyes include naphthopyrans such as those shown in Table 1. The dyes may include polymerizable functional groups such that they are copolymerized into the resulting contact lens. Examples of polymerizable functional groups include (meth)acrylates, (meth)acrylamides, vinyls and the like. In one embodiment, a photochromic dye is selected that, when in an activated state, absorbs across the visible spectrum but, when unactivated, absorbs below about 430 nm and less than about 10% across the visible spectrum.

The amount of thermochromic compound used will be that effective to achieve desired reduction in percent transmission at the specific wavelengths where selected thermochromic compound is active. The particular amount used also will depend upon the coloring strength and molar absorptivity of the selected compound(s), the lens material selected as well as the thickness of the lens.

In another embodiment the contact lens may contain a mixture of thermochromic compounds, at least one thermochromic compound in mixture with other fixed light absorbing compounds, including pigments, dyes and UV absorbing compounds or may contain multiple layers of thermochromic compounds, such as are used to make polarizing lenses.

Once the photoinitiator and thermochromic compound have been selected, step 104 is executed wherein a mixture of contact lens-forming materials is disposed in a mold. Step 104 is explained in additional detail with reference to FIG. 2A and FIG. 2B.

Figure 2A:
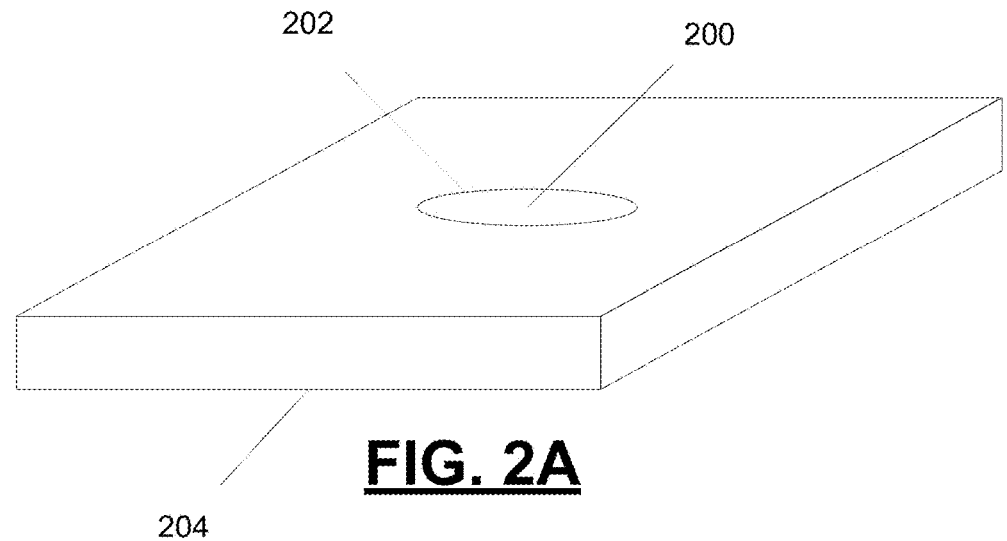
FIGS. 2A and 2B are perspective and profile views of one pallet for use with the invention.
Figure 2B:
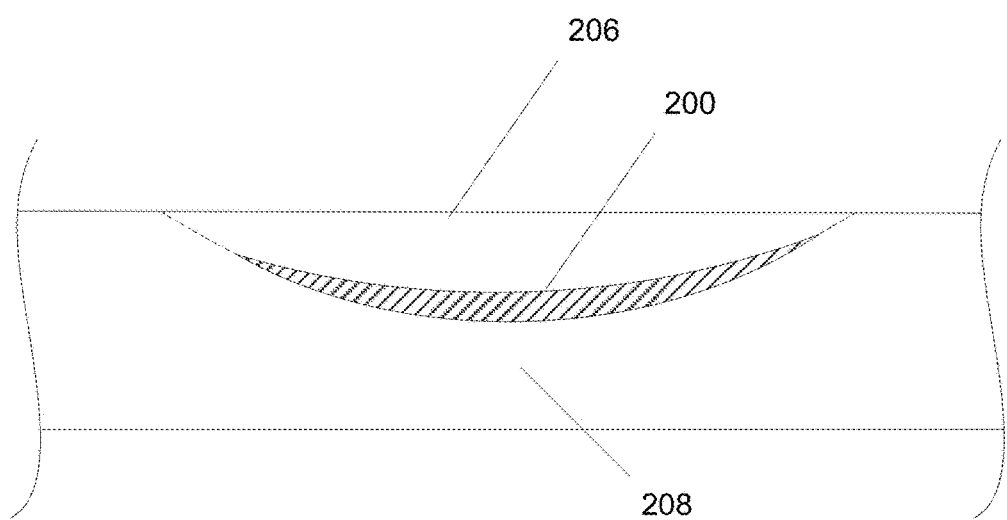

Referring to FIG. 2A, reaction mixture 200 is disposed in mold 202 which is supported by pallet 204. In one embodiment, the mold is a thermoplastic optical mold, made from any suitable material including, without limitation, polypropylene, polystyrene, and/or Zeonor®: cyclic olefin polymer resins. In certain embodiments, the mold is selected to be transparent to wavelengths that will activate the photoinitiator, thus permitting irradiation from the bottom side of the mold. In other embodiments, such as those using thermal initiation, the mold 202 is optically opaque. A "reaction mixture" is the mixture components, including, reactive components, diluent (if used), initiators, crosslinkers and additives which, when subjected to polymer forming conditions, form a polymer. Reactive components are the components in the reaction mixture, which upon polymerization, become a permanent part of the polymer, either via chemical bonding or entrapment or entanglement within the polymer matrix. For example, reactive monomers become part of the polymer via polymerization, while non-reactive polymeric internal wetting agents, such as PVP become part of the polymer via entrapment. The diluent (if used) and any additional processing aids do not become part of the structure of the polymer and are not part of the reactive components. Mixture 200 includes one or more polymerizable monomers suitable for forming contact lenses. Such monomers are known in the art and are generally selected to produce polymerization products with high water and oxygen permeability.

The invention may be used to provide hard or soft contact lenses made of any known lens material, or material suitable for manufacturing such lenses. Preferably, the lenses of the invention are soft contact lenses having water contents of about 0 to about 90 percent, and in another embodiment between about 20 and about 75% water. In yet another embodiment the contact lenses of the present invention have a water content of at least about 25%. The lenses of the present invention may also have other desirable properties, including a tensile modulus of less than about 200 psi, in some embodiments less than about 150 psi and in other embodiments less than about 100 psi. The lenses may further have oxygen permeabilities of greater than about 50 psi, and in some embodiments greater than about 100 psi. It should be understood that combinations of the foregoing properties are desirable, and the above referenced ranges may be combined in any combination.

In one embodiment, the lenses are made of hydrophilic components, silicone-containing components and mixtures thereof to form polymers such as siloxanes, hydrogels, silicone hydrogels, and combinations thereof. Material useful for forming the lenses of the invention may be made by reacting blends of macromers, monomers, polymers and combinations thereof along with additives such as polymerization initiators. Suitable materials include, without limitation, silicone hydrogels made from silicone macromers and hydrophilic monomers.

Reaction mixtures for making the contact lenses are well known and the components of such mixtures are commercially available. Examples polymers suitable for forming contact lenses include but are not limited to etafilcon A, genfilcon A, lenefilcon A, polymacon, balafilcon, acquafilcon, comfilcon, galyfilcon, senofilcon, narafilcon and lotrafilcon. In another embodiment, contact lens formulations include etafilcon, senofilcon, balafilcon, galyfilcon, lotrafilcon, comfilcon, filcon II 3, asmofilcon A, and silicone hydrogels, as prepared in U.S. Pat. No. 5,998,498; U.S. patent application Ser. No. 09/532,943, a continuation-in-part of U.S. patent application Ser. No. 09/532,943, filed on Aug. 30, 2000, and U.S. Pat. No. 6,087,415, U.S. Pat. No. 6,087,415, U.S. Pat. No. 5,760,100, U.S. Pat. No. 5,776,999, U.S. Pat. No. 5,789,461, U.S. Pat. No. 5,849,811, U.S. Pat. No. 5,965,631, U.S. Pat. No. 7,553,880, WO2008/061992, US2010/048847. These patents are hereby incorporated by reference for the hydrogel compositions contained therein.

In one embodiment, the reaction mixture used is a HEMA based hydrogel, such as etafilcon A. Etafilcon A, disclosed in U.S. Pat. Nos. 4,680,336 and 4,495,313 incorporated herein in their entireties by reference, generally is a formulation of 100 parts by weight ("pbw") HEMA, about 1.5 to about 2.5 pbw MAA, approximately 0.3 to about 1.3 pbw ethylene glycol dimethacrylate, about 0.05 to about 1.5 pbw 1,1,1,-trimethylolpropane trimethacrylate, and about 0.017 to about 0.024 pbw of a visibility tint. The phrase "polymerizable monomers" includes monomers with large molecular weights, sometimes referred to as macromers. A reaction mixture of different polymerizable monomers may also be used, resulting in the production of a co-polymer.

In one embodiment, mixture 200 also includes one or more selected visible light photoinitiators that are activated by exposure to visible light to initiate a chain reaction that causes the aforementioned monomers to polymerize.

Mixture 200 further includes the selected thermochromic compound and in one embodiment photochromic dye that becomes colored upon exposure to light but will revert to its original color shortly after the light is discontinued. In is unactivated (clear) state, the dye absorbs below about 430 nm and becomes activated. Once activated, the absorbance range changes to overlap with the visible spectrum (380-780 nm) and thus becomes colored. This color, in turn, blocks the very wavelengths that would otherwise activate an photoinitiator that typically absorbs below about 420 nm The presence of both the thermochromic compound and the photoinitiator in the same reaction mixture can make controlled activation of the photoinitiator problematic. Without wishing to be bound to any particular theory, applicants believe the activation of the thermochromic compound in the same spectral region as the photoinitiator causes the dye to at least partially "shield" the photoinitiator. The incomplete activation of the initiator prevents curing and/or results in a non-uniform or anisotropic cure that causes material defects and stresses to form within the lens. These defects negatively impact the mechanical and optical properties of the resulting contact lens. One embodiment of the present invention where the thermochromic compound comprises at least one photochromic compound, the process utilizes filters to remove at least a portion of the wavelengths that result in excitation of the dye while transmitting wavelengths that activate the photoinitiator. See step 106 of FIG. 1. Step 106 is illustrated in more detail in FIG. 3.

Figure 3:
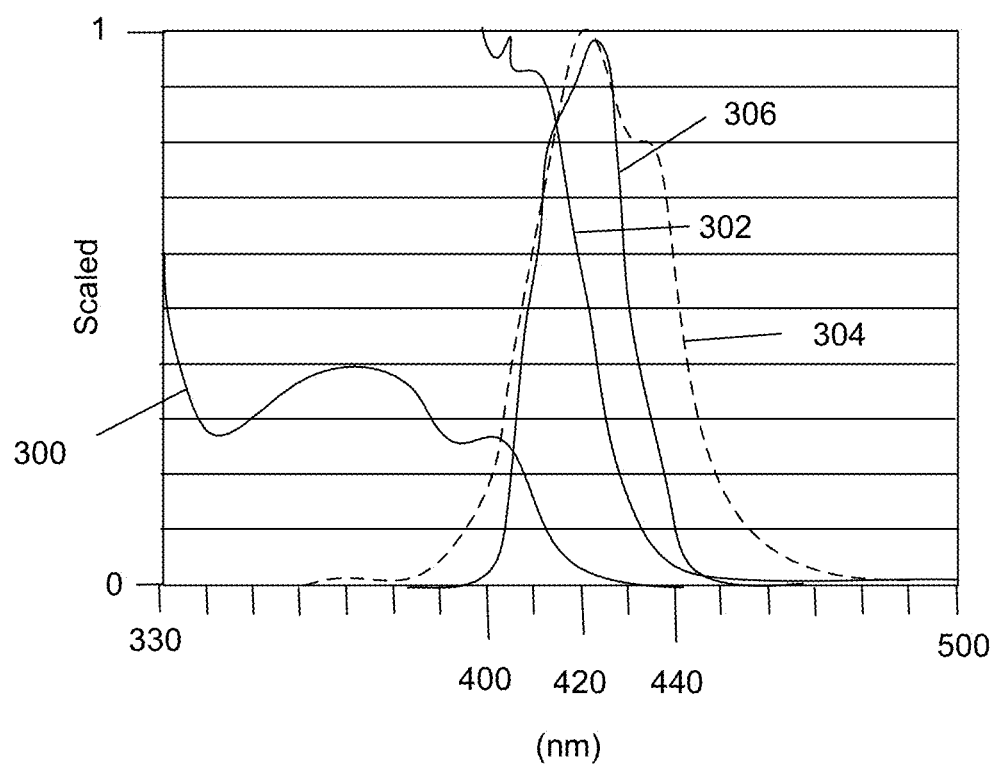
FIG. 3 is are absorbance spectra of a photochromic dye, photoinitiator, and filters of one embodiment.

Suitable filters are selected based on the spectra of the photochromic dye and photoinitiator. Referring to FIG. 3, the spectrum of a dye 300 is compared to the spectrum of a photoinitiator 302 and the spectrum of the light from a particular light source 304. A filter is used that permits transmission of select wavelengths of light (line 306). In the example of FIG. 3, the photoinitiator is Irgacure® 1700, the light source is a TL 03 lamp and the photochromic dye is Dye-1. In this instance, one can preferentially activate the photoinitiator 302 in the presence of dye 300 by providing cure light to the mixture at a wavelength above 400 nm.

Although dye 300 is somewhat active between 400 nm and 420 nm, photoinitiator 302 is more responsive (i.e. has a larger molar absorptivity) than the dye at such wavelengths. At least a portion of the wavelengths that activate the dye (e.g. those below 400 nm) have been omitted. In one embodiment, a long pass filter is used to omit wavelengths below about 400 nm but transmit wavelengths above about 400 nm. In another embodiment, a different band pass filter is used to transmit only wavelengths within the range of about 400 nm to about 420 nm, but remove wavelengths outside of this range. In yet another embodiment, a band pass filter selects wavelengths within the range of about 420 to about 440 nm. These wavelengths were selected based on the spectra presented in FIG. 3 for the particular photochromic dye and photoinitiator illustrated therein. In other embodiments, different frequencies are selected to permit preferential excitation of photoinitiators with different absorption spectra. Examples of suitable filters include SCHOTT GG420 filters or Encapsulite C20 filters. In other embodiments, the light source is selected so as to provide cure light that does not irradiate within the absorption of the wavelength of the un-activated dye and filtering is unnecessary. Examples of such light sources include customized light emitting diodes (LEDs).

Figure 4A:
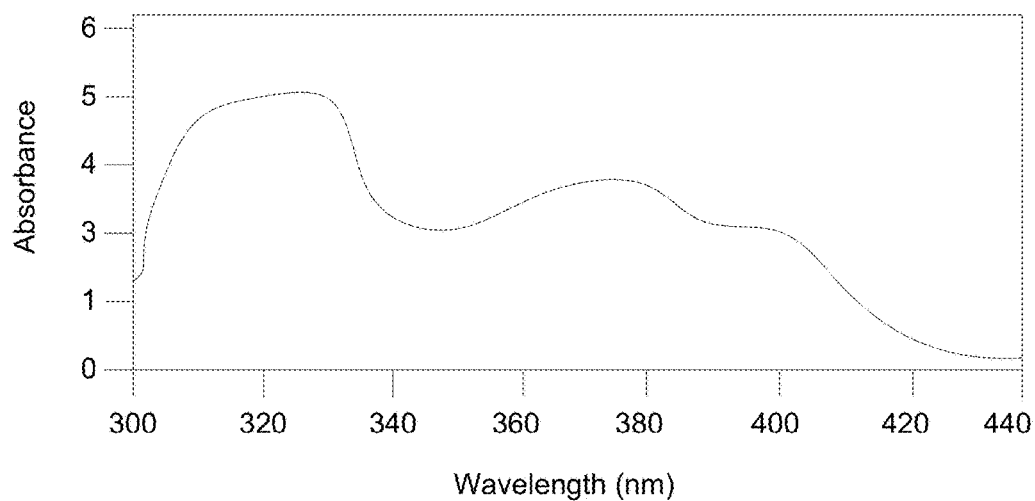
FIGS. 4A and 4B are absorbance spectra of a dye in an activated and unactivated state.
Figure 4B:
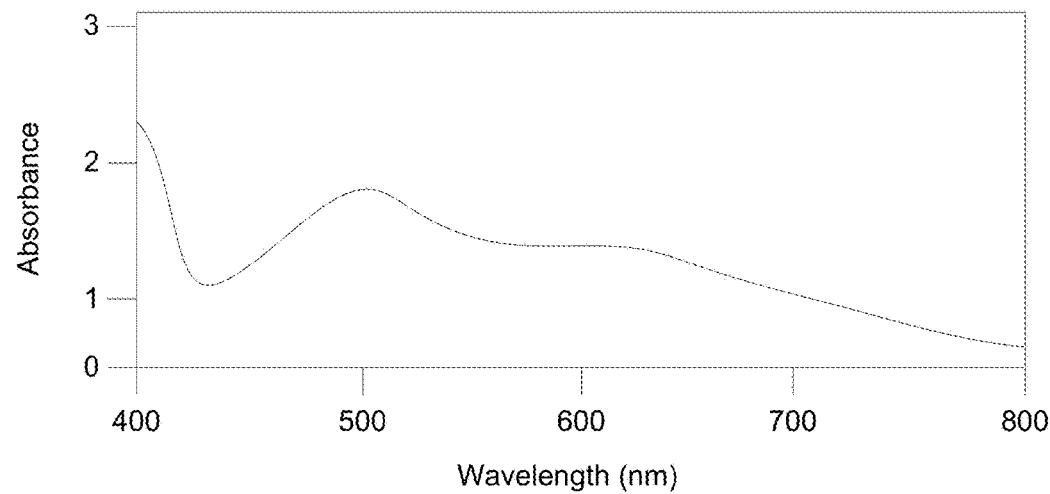
Figure 5:
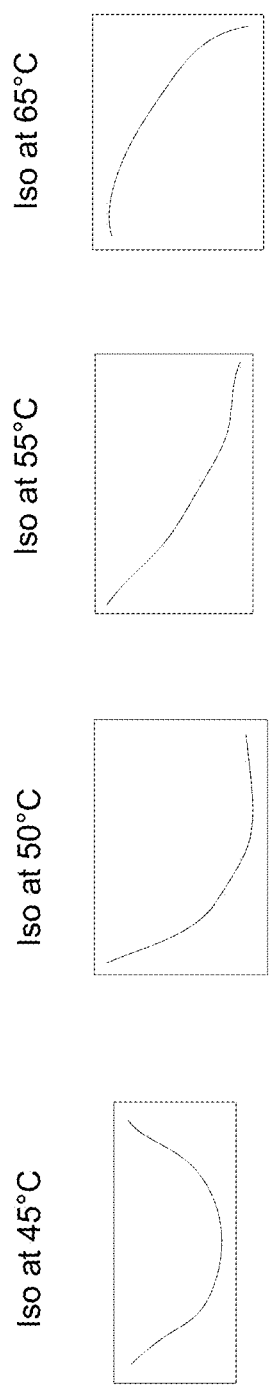
FIG. 5 depicts the profiles of various contact lenses cured at various temperatures.

Applicants have discovered that the optical and mechanical properties of the resulting lens can be further improved by performing the curing process at a temperature where the thermochromic dye is inactive or less active (step 108 of FIG. 1). By way of example and without wishing to be bound by any particular theory, in the embodiment where the thermochromic compound is a photochromic compound, it is believed that the elevated temperature maintains the photochromic dye in a closed (not activated) state. Thus, the absorbance spectrum of the photochromic dye is different at room temperature when compared to the same spectrum at an elevated temperature. For photochromic dyes, this generally results in a decrease of the molar absorptivity at the very wavelengths that overlap with the $\lambda_{max}$ of the photoinitiator. By maintaining an elevated temperature during the photocure, an increased amount of the dye is maintained in a closed state, thus effectively reducing the activation of dye that interferes with the polymerization process. See FIG. 4A depicting naphthopyran Dye-1 in an inactive state and, in FIG. 4B, the same dye in an activated state. In FIG. 4A, it is clear that the closed dye is relatively inactive at wavelengths above 420 nm. In contrast, FIG. 4B shows the activated dye absorbs at wavelengths above 420 nm. A series of photochromic contact lenses were cured at various temperatures using filtered light. See examples 1 to 4 described below. FIG. 5 depicts profiles of these lenses.

In another embodiment where the thermochromic dye is a leuco dye, such as spirolactones (such as crystal violet lactone), fluorans, spiropyrans, and fulgides, in combination with weak acids such as bisphenol A, parabens, 1,2,3-triazole derivates, and 4-hydroxycoumarin, cure may be conducted at temperatures between about 5 and about 60° C. In yet another embodiment, where the thermochromic dye is a liquid crystal, such as such as cholesteryl nonanoate or cyanobiphenyl, the cure may be conducted at temperatures between about 10 and about 80° C.

Referring to the series of lens cross sections depicted in FIG. 5, lenses cured at 45° C. (first image, left) showed poor curing and had inverted cross sections that were unacceptable for use on a human eye. Lenses cured at 50° C. showed some degree of improvement (second image from the left). Lenses cured at 55° C. showed further improvement (third cross section). Lenses cured at 65° C. displayed only minor flattening in cross section and were found to provide acceptable optics. These results demonstrate an improvement in contact lens profile and optics when the lenses are cured at an elevated temperature. Accordingly, given the teaching of this application desired temperature ranges can be selected to produce acceptable profiles and optics for a range of particular reaction mixtures.

By way of illustration, when photochromic dye (such as Dye-1, a naphthopyran photochromic compound shown in Table 1) is used, cure temperature ranges of about 55° C. to about 90° C. may be used. In another embodiment, a temperature range of about 65° C. to about 80° C. is used. In yet another embodiment a temperature of about 80° C. is used. Other dyes may have different preferred temperature ranges.

Applicant has also discovered that, although filtering the light and elevating the temperature improves the properties of the resulting lenses, at least in some instances, these are not the only factors. Contact lens properties can be further improved by balancing the light received by the mixture 200 on the exposed side 206 and mold-contacting sides 208. See FIG. 2B. The precise conditions necessary to balance the intensities will depend upon the composition and thickness of the reaction mixture, the composition of the pallet and the nature of the filter(s) and light source(s). After benefiting from reading this specification one of ordinary skill can determine the optimum balancing conditions for a particular formulation.

In some embodiments, for example for contact lenses with low thermochromic compound concentrations, special balancing of light intensity may not be necessary. The mixture is sufficiently thin such that the light intensity at the exposed surface and the mold-contacting sides are substantially the same. In these instances, the cured contact lens that results is adequate. Similarly, in some embodiments, it is possible to omit any special balancing by restricting the thermochromic compound to a particular region of the lens (e.g. a pupil-only thermochromic lens).

Figure 6:
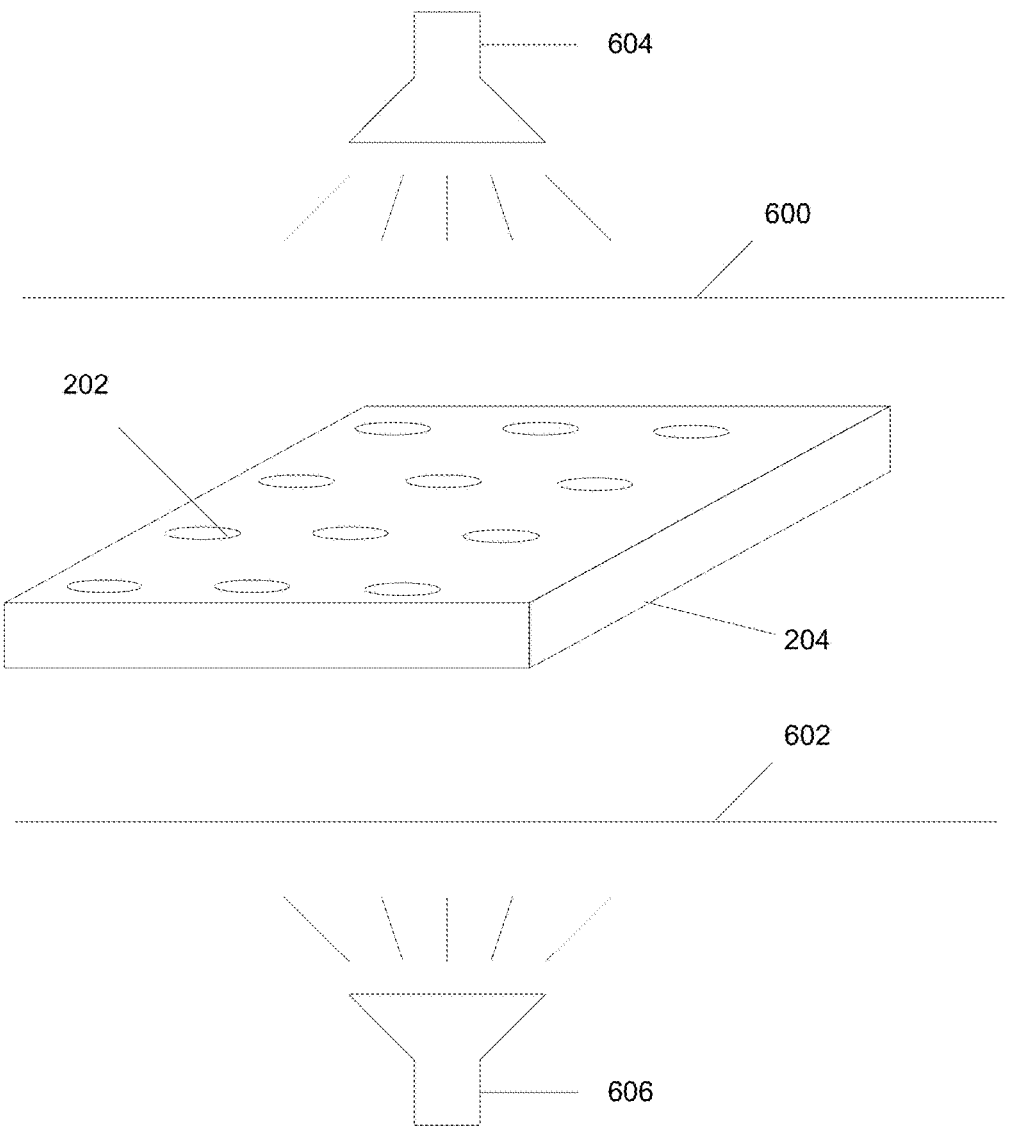
FIG. 6 is a schematic representation of one apparatus for curing a content lens.

In certain instances, the intensity of the light at the mold-contacting side is substantially less than the intensity at the exposed surface—presumably due to absorption of the light by the thermochromic compound as the light passes through the mixture. In these situations, the profile of the resulting lens is less than desirable. A secondary light source can be added to illuminate from underneath an optically transparent mold to properly balance the light intensities. FIG. 6 depicts such a system.

Referring to FIG. 6, two or more filters 600, 602 are used to both filter the wavelength and balance the intensity of light emitted from one or more light sources 604, 606 before such light illuminates reaction mixture 200. The pallet 204 permits the wavelengths used to activate the photoinitiator by passing through the bottom of the pallet, thereby allowing the reaction mixture within mold 202 to be illuminated from both the exposed side 206 and the mold-contacting side 208 (see FIG. 2B). The light sources, filters, and pallet are arranged such that equal intensities of light are delivered to both the exposed and mold-contacting sides of the mixture. In one embodiment, not shown, the pallet 204 functions as a filter and removes certain wavelengths, thus obviating the need for filter 602.

In some embodiments, the intensity of one of the light sources is increased to adjust for a loss of light intensity between the light source and the mixture 200. For example, in such an embodiment, bottom light source 606 may have an intensity greater than top light source 604 to adjust for the loss of light intensity due to the bottom light traveling through or shielded by the pallet 204. By way of illustration and not limitation, the intensity of top light source 604 may be about 1 mW/cm$^2$ while the intensity of bottom light source may be about 2 mW/cm$^2$. Differing intensity values are selected depending on the amount of light blocked by the respective filters and the transmissivity or shielding of the pallet 204. Similarly, filters that reduce the intensity of the light can be used to balance the intensity of the light that actually reaches the reaction mixture.

Figure 7A:
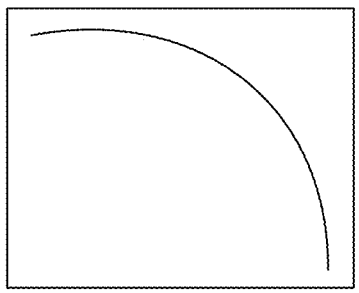
FIGS. 7A to 7D are depictions of various contact lenses cured under various conditions described in Examples 5-8.
Figure 7B:
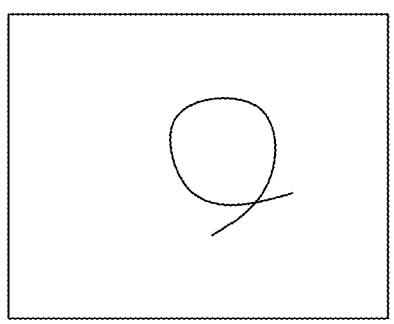
Figure 7C:
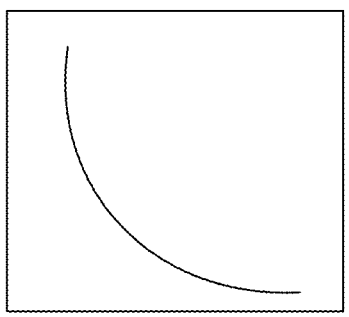
Figure 7D:
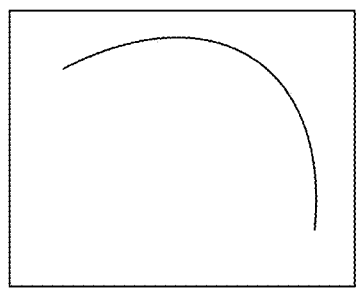

FIGS. 7A to 7E illustrate the effects of balanced or misbalanced illumination. FIG. 7A shows the desired profile of a properly formed contact lens that does not include a photochromic dye. FIG. 7B shows the profiles of contact lenses made using no filter and curing only from the top side. FIG. 7C shows the profiles of contact lenses made using a filter and curing only from the top side. Although not visible in FIG. 7C, the lens is inverted. FIG. 7D shows the profiles of contact lenses made by curing from both sides using a filter, but with unbalanced light intensities. FIG. 7E, which closely approximates the desired profile of FIG. 7A, shows the profiles of contact lenses made by curing from both sides using a filter with balanced light intensities. See examples 5 to 9.

Once curing is completed, the lens is released from the mold and may be treated with a solvent to remove the diluent (if used) or any traces of unreacted components. In one embodiment the solvent removal is conducted using a primarily aqueous solution. The lens is then hydrated to form the hydrogel lens.

Using the techniques described above, several forms of contact lenses can be made. In some embodiments, the thermochromic compound is homogenously dispersed throughout the resulting contact lens. In such an embodiment, the entire contact lens is thermochromic. In other embodiments, only the central portion of the resulting contact lens includes the thermochromic compound. Since the central portion rests atop the pupil, the resulting contact lens is a pupil-only thermochromic contact lens. The central portion, or central circular area may be the same size as the optic zone, which in a typical contact lens is about 9 mm or less in diameter. In one embodiment, the central circular has a diameter of between about 4 and about 9 mm and in another between about 6 and about 9 mm in diameter and in another embodiment between about 6 and about 8 mm.

The dye can be placed using a variety of techniques to provide a region of a specified diameter. For example, the composition comprising the dye may be applied to at least a portion of a molding surface via pad printing, ink jetting, spin coating and the like. In these embodiments the dye composition may comprise additional components known to be useful including binding polymers which may be reactive or non-reactive, solvent, and optionally polymerizable components, chain transfer agents, initiators and combinations thereof. The dye composition may react with the reactive mixture, or may swell and become entangled by the reactive mixture. If the dye composition is reactive, it may be partially or fully cured prior to dispensing the reactive mixture into the mold. If the dye composition is non-reactive it may be desirable to evaporate some or all of the solvent prior to dispensing the reactive mixture. The type and concentration of the non-dye components of the dye compositions which are known in the art may be used in the present invention. Examples include those disclosed in EP1448725, WO01/40846, U.S. Pat. No. 5,658,376, US20090244479, WO2006/110306 and U.S. Pat. No. 6,337,040.

If an initiator is included in the dye composition the initiator and thermochromic compound are selected to have absorption profiles which do not substantially overlap at the selected cure temperature. Multiple layers of dye composition may be applied to the mold, and the layers may contain no thermochromic, the same thermochromic compound or different thermochromic compounds. An example of this embodiment is applying alternating layers of dye composition, each containing a liquid crystal, to form a polarized contact lens. In this embodiment, the alternating layers are cured under different conditions to provide layers in which the liquid crystals have alternating orientations, creating the desired polarizing effect. In another embodiment multiple layers of the same thermochromic compound are applied, each centered, but having a different diameter, thereby producing a lens with a graduated concentration of thermochromic compound.

After the cure composition is precured or the solvent evaporated, the reactive mixture is dosed to the mold as described above. The reactive mixture may comprise at least one additional thermochromic compound, which may be the same or different than the thermochromic compound used in the dye composition layer. Alternatively, the reactive mixture may be free from thermochromic compounds. After the reactive mixture is dosed, the reactive mixture is cured.

Examples of suitable diameters include 4 mm, 6 mm, 9 mm and 11.4 mm. In one embodiment the reactive mixture comprising the thermochromic dye is deposited or dispensed via microdosing, such as disclosed in U.S. Pat. No. 7,560,056, and U.S. application Ser. No. 13/082,447, entitled "Pupil-Only Photochromic Contact Lenses Displaying Desirable Optics and Comfort", co-filed on Apr. 8, 2011.

To support the theory of operation, several experiments were conducted in which the time required to cure the mixture was measured as a function of increased dye concentration. The results of these experiments demonstrated that higher dye concentration resulted in prolonged cure times. At a dye concentration of about 3% (MXP7-1631 dye) the mixture did not cure at a temperature of 40° C. See Example 9. This supports the hypothesis that the dye interferes with the activation of the photoinitiator.

To further support the theory of operation, the residual monomer concentration of a series of lenses were made with and without pad printing of a photochromic dye. The lenses were cured without being hydrated as the reaction mixture passed through a cure tunnel where they were irradiated with light as they passed through various zones. Samples were removed from the apparatus and tested for residual photoinitiator and residual monomer after passing through a certain number of zones. Thus, a sample that was removed after passing through five cure zones experienced a longer residence time than a sample that was removed after passing through two cure zones. See example 11.

Figure 8A:
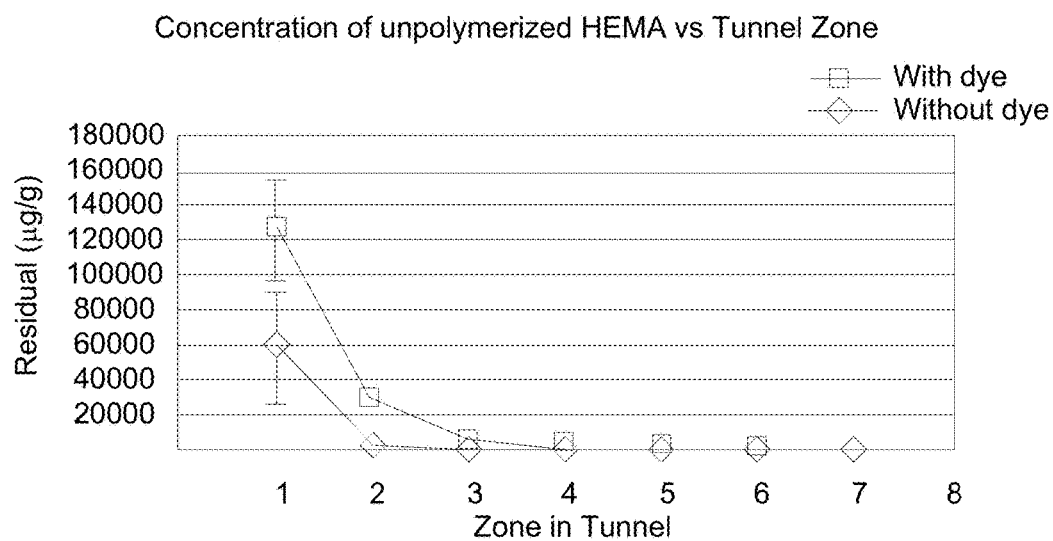
FIGS. 8A and 8B are graphs of the amount of residual monomer remaining in the contact lenses.
Figure 8B:
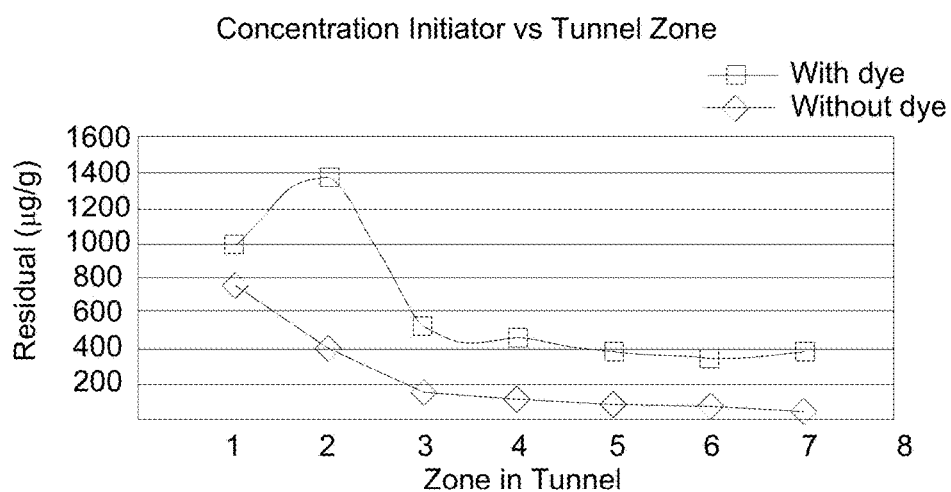

The results, shown in FIG. 8A, show the photochromic dye is inhibiting the initiator from starting a free radical polymerization. Those samples where a photochromic dye was present show significantly larger concentrations of unpolymerized monomer relative to the corresponding control that lacked a photochromic dye. Likewise, FIG. 8B shows the concentration of the photoinitiator is larger when the photochromic dye is present. It is noteworthy that, when a photochromic dye is used, the concentration of the photoinitiator achieved a stead-state concentration that never reaches zero or otherwise unifies with the control.

Similarly, rheology data was obtained for photochromic lenses made with and without filters. See Example 11. The results (FIGS. 9A and 9B) show the gel point differences between lenses made with, and without, a photochromic dye.

Figure 9A:
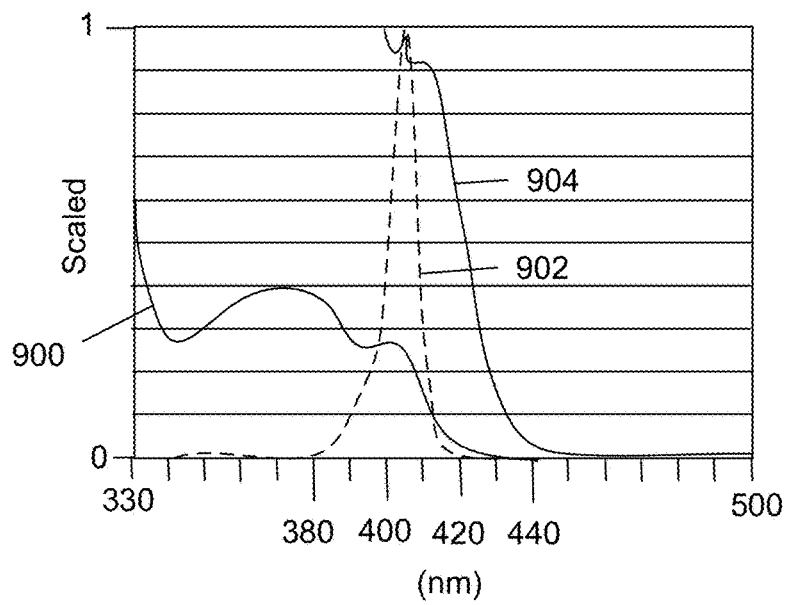
FIGS. 9A and 9B are absorbance spectra and rheology graphs of one contact lens formation process.
Figure 9B:
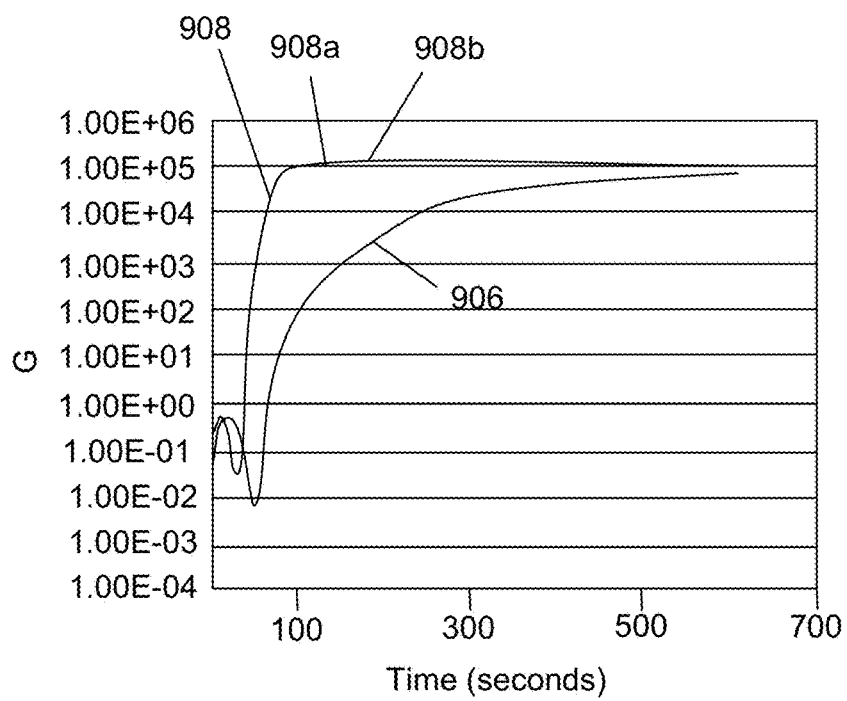

FIG. 9A illustrates spectra of an unactivated photochromic dye (line 900), a photoinitiator (line 904) and a filtered light source that removed wavelengths below 380 nm (line 902, $\lambda_{max}$ around 400 nm). FIG. 9B depicts rheology data from a photochromic lens (line 906) and a non-photochromic control (line 908) cured using the conditions of FIG. 9A. The interference from the photochromic dye causes the modulus (G) to build more slowly than a corresponding monomer cured without dye present, lines 906 and 908 respectively. The control (908) exhibited a 95% conversion gel point of 37 seconds (point 908a) and a 99% conversion gel point at point 908b. This gap in % conversion at gel point shows significant differences between the photochromic lens and the target control lens. The resulting photochromic polymers were deemed unsatisfactory for making contact lenses.

Figure 10A:
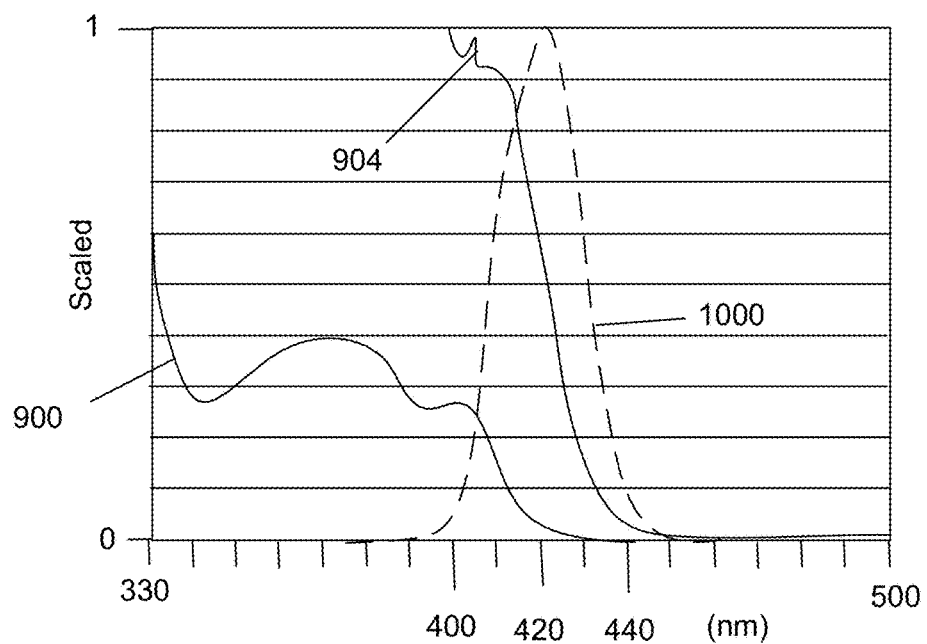
FIGS. 10A and 10B are absorbance spectra and rheology graphs of another contact lens formation process.
Figure 10B:
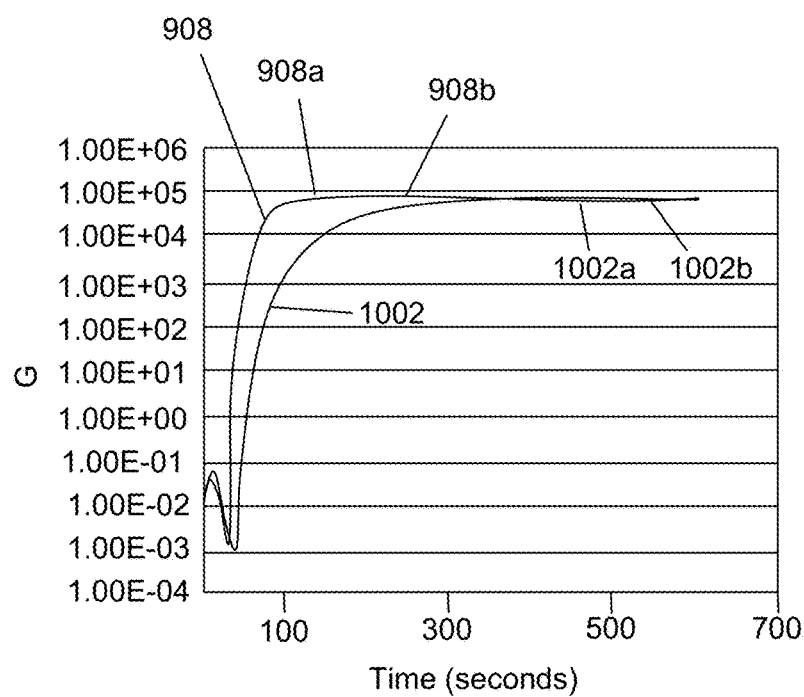

FIG. 10A is similar to FIG. 9A, but differs therefrom in that a different filter is used. In FIG. 10A, filtered light 1000 has wavelengths below 400 nm removed. FIG. 10B depicts rheology data from a photochromic lens (line 1002) and a non-photochromic control (line 908) cured using the conditions of FIG. 10A. Compared to FIG. 9B, the two lines 1002, 908 are substantially closer and thus the resulting photochromic lenses more closely match the control lens. The resulting photochromic lenses were deemed satisfactory. The 95% conversion gel point (1002a) and 99% conversion gel point (1002b) are shown.

Figure 11A:
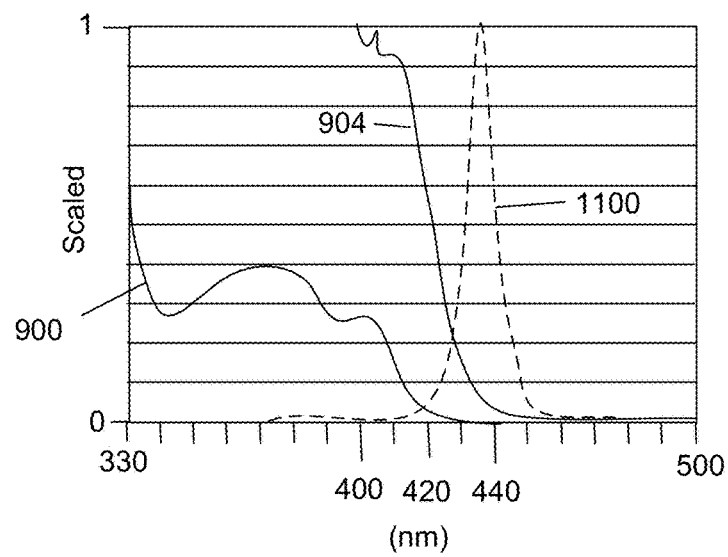
FIGS. 11A and 11B are absorbance spectra and rheology graphs of yet another contact lens formation process.
Figure 11B:
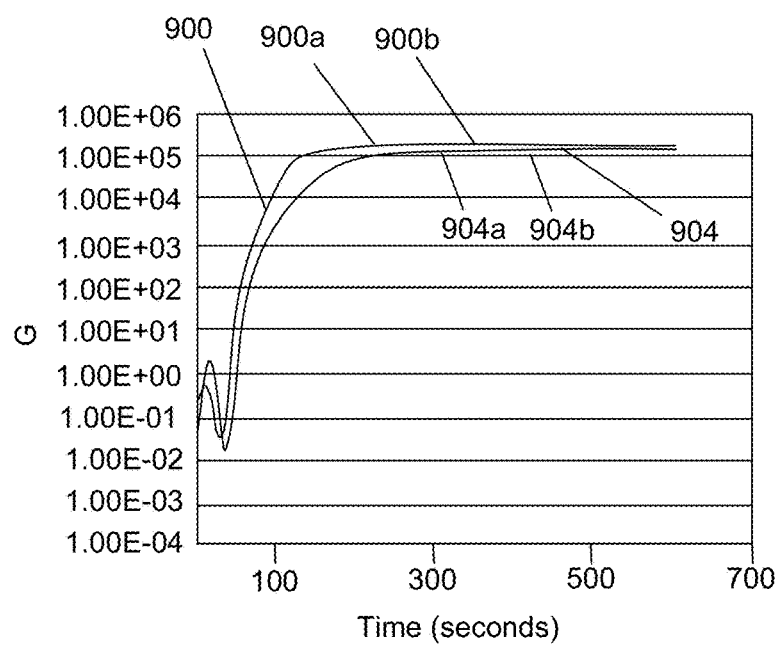

FIG. 11A illustrates spectra of an unactivated photochromic dye (line 900), a photoinitiator (line 904) and a light source (line 1100, λ$_{max}$ around 440 nm). Light source 1100 removes wavelengths below 420 nm. FIG. 11B depicts a rheology data from photochromic lens (line 904) and a non-photochromic control (line 900) cured using the components of FIG. 11A. Thus, the light source and filters removed wavelengths below about 420 nm where the dye is most responsive. When the lower wavelengths were removed by the filter, the activation of the dye was minimized and the modulus of the photochromic lens 904 became more like that of the control 900.

EXAMPLES

TABLE 1

Common abbreviations

| Abbreviation | Compound |
|---|---|
| Dye-1 | 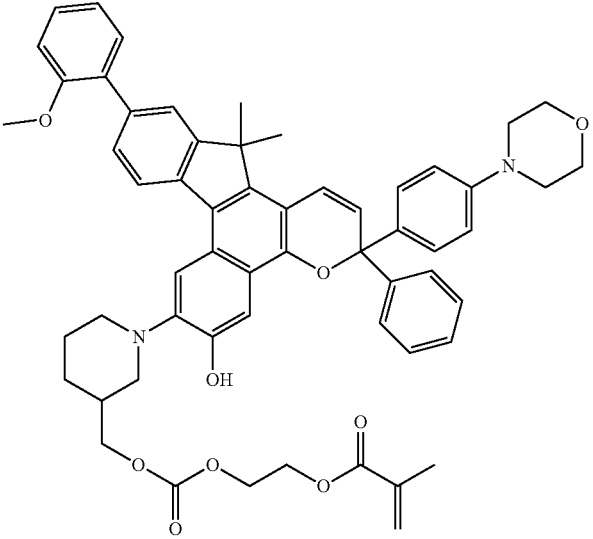 [SMILES: C=C(C)C(=O)OCCOC(=O)OCC1CCCN(c2cc3c4c(c5c(c3cc2O)OC(c2ccccc2)(c2ccc(N3CCOCC3)cc2)C=C5)C(C)(C)c2cc(-c3ccccc3OC)ccc2-4)C1] |
| Dye-2 | 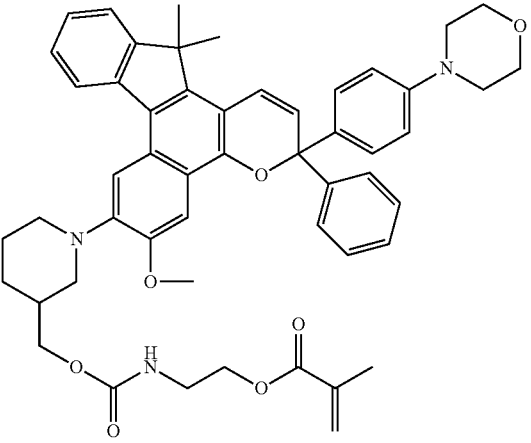 [SMILES: C=C(C)C(=O)OCCNC(=O)OCC1CCCN(c2cc3c4c(c5c(c3cc2OC)OC(c2ccccc2)(c2ccc(N3CCOCC3)cc2)C=C5)C(C)(C)c2ccccc2-4)C1] |
| Dye-3 | 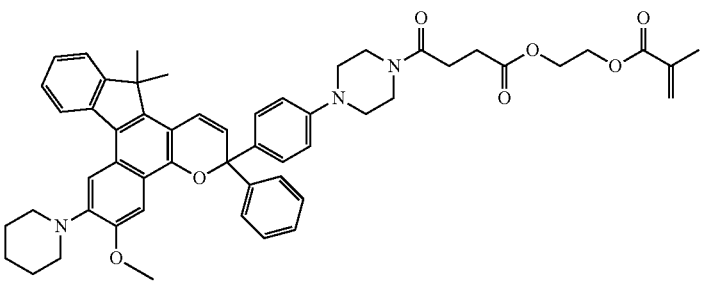 [SMILES: C=C(C)C(=O)OCCOC(=O)CCC(=O)N1CCN(c2ccc(C3(c4ccccc4)C=Cc4c5c(c6cc(N7CCCCC7)c(OC)cc6c4O3)-c3ccccc3C5(C)C)cc2)CC1] |

TABLE 1-continued

Common abbreviations

| Abbreviation | Compound |
|---|---|
| Dye-4 | (structure shown) |
| TMPTMA | trimethylolpropane trimethacrylate |
| EDGMA | ethyleneglycol dimethacrylate |
| MAA | methacrylic acid |
| HEMA | 2-hydroxyethylmethacrylate |
| Norbloc | 2-(2'-hydroxy-5-methacryloxyethylphenyl)-2H-benzotriazole |
| Glucam 20 | ethoxylated methyl glucose ether |

Five formulations were utilized in the follow examples. The percent composition of each sample is shown in Table 2:

TABLE 2

| Component | A (control) | B | C | D | E |
|---|---|---|---|---|---|
| Dye-1 | 0 | 2.1 | 2.8 | 1.2 | 2.8 |
| Irgacure ® 1700 (initiator) | 1.33 | 1.33 | 1.33 | 0 | 0 |
| Irgacure ® 819 (initiator) | 0 | 0 | 0 | 0.28 | 0.28 |
| TMPTMA | 0.09 | 0.09 | 0.09 | 0.09 | 0.09 |
| EDGMA | 0.77 | 0.77 | 0.77 | 0.77 | 0.77 |
| MAA | 1.94 | 1.94 | 1.94 | 1.94 | 1.94 |
| HEMA | 94.92 | 93.72 | 92.12 | 94.77 | 93.17 |
| Norbloc | 0.95 | 0.95 | 0.95 | 0.95 | 0.95 |

The components listed in Table 2 were mixed with Glucam 20 in the following amount 55 wt % monomer with 45 wt % diluent.

Example 1—Cure Temperature of 45° C.

A front curve mould (Zeonor) was pad printed with a dye base formed from 7% Dye-1 and 93% clear base (49.4 wt % Isopropyllactate, 12.4 wt % 1-Ethoxy-2-propanol, 0.9 wt % 1-Octanethiol, 1.63 wt % Glycerol, 35 wt % HEMA, 0.48% methacrylic acid, and 0.21 wt % Azobis-(2-methylbutyronitrile) (AMBM). The clear base was made by adding the 1-octanethiol, monomers and solvents, except for about 50-100 cc of the isopropyllactate, were mixed in a 5 liter blue cap bottle and stirred for 10 minutes. The mixture was then poured into a 5 L stainless steel reactor with stirrer and nitrogen. The mixture was stirred and heated for approximately 25 min. until the temperature was 68° C. After the temperature was stabilized at 68° C., the AMBN was dissolved in the remaining isopropyllactate and added while opening the nitrogen bleed. The polymerization was allowed to proceed for 16-24 hours after which the temperature was increased to 80° C. and the reaction was completed. The mixture was then allowed to equilibrate to room temperature.

The diameter of the print was 11.44 mm. The front and back of the curve moulds were degassed with nitrogen. The front curve mould was dosed with a reactive monomer mix that contained Control A (see Table 2) no dye in RMM. A base curve mould was placed on the front curve containing monomer and the assembled moulds were moved to a cure box and thereafter heated to a cure temperature of 45° C. The system was allowed to equilibrate for five minutes. Once equilibrated, the system was cured at 3.5 mW/cm$^2$ with Philips TL03 lamps using CG420 filter for ten minutes. The base curve mould was removed and the front curve was hydrated in DI water at 70° C. for ten minutes. The resulting lenses were subjected to customary packaging and sterilization processes. The lenses were cross-sectioned and an image was obtained. The image is shown in FIG. 5.

Example 2—Cure Temperature of 50° C.

Example 2 was conducted in a substantially identical fashion as Example 1 except in that the cure temperature was 50° C. The lenses were cross-sectioned and an image was obtained. The image is shown in FIG. 5.

Example 3—Cure Temperature of 55° C.

Example 3 was conducted in a substantially identical fashion as Example 1 except in that the cure temperature was 55° C. The lenses were cross-sectioned and an image was obtained. The image is shown in FIG. 5.

Example 4—Cure Temperature of 65° C.

Example 2 was conducted in a substantially identical fashion as Example 1 except in that the cure temperature was 65° C. The lenses were cross-sectioned and an image was obtained. The image is shown in FIG. 5.

Examples 5 8

The front and back curve moulds (Zeonor) were degassed with nitrogen. For Examples 6-8, the front curve mould was dosed with a reactive monomer mix containing 2.1% Dye-1 (Formulation B, Table 2). For Example 5 (control) Formulation A was dosed into the front curve. A base curve mould was placed on the front curve containing monomer mix. The assembled moulds were moved to a cure box and heated to 65° C. The assembly was allowed to equilibrate for five minutes. Once equilibrated, the system was cured with Philips TL03 lamps and CG420 filter for ten minutes at the cure intensity and cure set-ups specified in Table 3. The base curve mould was removed and the front curve was hydrated in DI water at 70° C. for ten minutes. The resulting lenses were subjected to customary packaging and sterilization processes.

TABLE 3

| Ex. # | Filter | Top intensity (mW/cm$^2$) | Bottom intensity (mW/cm$^2$) | Fig. # | Xsection appearance |
|---|---|---|---|---|---|
| 5 | Yes | 3 | 0 | 7A | Normal |
| 6 | Yes | | 0 | 7B | Rolled |
| 7 | Yes | 2.8 | 0.8 | 7C | Inverted, flared |
| 8 | Yes | 2.8 | 2.8 | 7D | |

The cross sections of the lenses made in Examples 5-8 are shown in FIGS. 7A-D. FIG. 7A is the cross-section of the lens of Example 5, formed with no photochromic dye, and displays a smoothly curved cross section indicative of a well formed spherical contact lens. FIG. 7B is the cross section of a lens formed with photochromic dye and cure from the top only. The lens cross section is rolled into a tube. This indicates uneven curing and shows the impact of the photochromic dye on curing in this Example is not controlled by use of filters alone. FIGS. 7C (Example 7) and D (Example 8) show the cross sections for lenses made with curing on both sides. In 7C the lens is inverted, but displays a smooth arc, a substantial improvement compared to Figure B. In FIG. 7D, the cross section for the lens cured with balanced intensity and filters on both sides, lenses with smooth, curved cross sections were obtained.

Example 9—High Dye Concentrations Prevents Curing

The photo-polymerization reaction of Formulations A-E were monitored with an ATS StressTech rheometer (available from ATS RheoSystems, 52 Georgetown Road, Bordentown, N.J. 08505) equipped with a photo-curing accessory, which included a temperature-controlled cell with a quartz lower plate and an aluminum upper plate, and an OmniCure mercury arc lamp (available from EXFO Photonic Solutions Inc., 2260 Argentia Rd., Mississauga, ON L5N 6H7 CANADA) with 420 nm band pass filter (available from Andover Corporation, 4 Commercial Drive, Salem, N.H. 03079-2800 USA) situated beneath the quartz plate. The intensity of the radiation, measured at the surface of the quartz window with an IL1400A radiometer and XRL140A sensor (available from International Light, Inc., 17 Graf Road, Newburyport, Mass. 01950), was regulated at 4.5±0.5 mW/cm$^2$. Each formulation was evaluated at 40° C., 55° C. and 70° C.

After approximately 0.25 mL of the reactive monomer mix was placed on the lower plate of the rheometer, the 25 mm diameter upper plate was lowered to 0.500±0.001 mm above the lower plate, where it was held until after the reaction reached the gel point. The sample was allowed to reach thermal equilibrium (~5 minutes, determined by the leveling-off of the steady shear viscosity of the sample as it warmed up) before the OmniCure was turned on and the reaction begun. During this time, while the sample was reaching thermal equilibrium, the sample chamber was purged with nitrogen gas at a rate of 400 sccm. After this initial purge the oxygen level in the sample chamber was monitored at 0.5±0.1% with a CheckPoint O$_2$ sensor (available from PBI Dansensor, available from Topac, 101 Derby St., #203 Hingham, Mass. 02043). During the reaction the rheometer continuously monitored the strain resulting from an applied dynamic stress (fast oscillation mode), where time segments of less than a complete cycle were used to measure the strain at the applied sinusoidal stress (applied at a frequency of 1.0 Hz). The dynamic shear modulus (G'), loss modulus (G"), and gap height were monitored as a function of exposure time. As the reaction proceeded the shear modulus increased from <1 Pa to >0.1 MPa, and tan δ(=G"/G') dropped from near infinity to less than 1. For many reactive crosslinking systems the gel point is defined as the time at which tan δ=1 (the crossover point when G'=G"). At the time that G' reached 100 Pa (shortly after the gel point), the restriction of the gap height on the upper plate was removed (Autotension Mode: Tension=0) so that the gap between the upper and lower plates could change as the reactive monomer mix shrank during cure, and the stress due to shrinkage was kept at a minimum. A measurement of the change in gap provides an estimate of the amount of shrinkage caused by the polymerization reaction. After a 10-minute exposure the OmniCure was turned off (i.e., the cure was terminated).

The rheology results for each of the formulations evaluated are shown in Table 4, below.

TABLE 4

| | | Rheology results | | | | |
|---|---|---|---|---|---|---|
| Temp | Data | A (control) | B | C | D | E |
| 40° C. | Gel point (seconds) | 30.5 | 32.7 | n/a | 99.0 | n/a |
| | Modulus (×10$^5$) | 3.745 | 1.837 | n/a | 1.050 | n/a |
| 55° C. | Gel point (seconds) | 29.0 | 69.0 | 128.5 | 68.5 | 141.5 |
| | Modulus (×10$^5$) | 2.529 | 1.678 | 0.430 | 1.676 | 0.277 |
| 70° C. | Gel point (seconds) | 18.0 | 57.0 | 101.5 | 62.0 | 95.5 |
| | Modulus (×10$^5$) | 2.216 | 1.972 | 0.597 | 1.705 | 0.393 |

Samples C and E failed to cure at 40° C. These samples contained 2.8% photochromic dye.

Example 10—Monitoring Polymerization Progress by Tunnel Zone

A protocol was executed to determine the rate of consumption for lenses that were pad-printed with a dye composition containing approximately 7% of Dye-1 and 93 wt % of the clear base described in Example 2 in comparison to lenses that were not pad-printed with the dye composition. Formulation A from Table 2 was dispensed in the pad-printed mold. Lenses were cured with both high (8 mW/cm$^2$) and low (4 mW/cm$^2$) intensity cures for comparison.

The experiment was carried through as follows: Closed pad printed, lens molds containing the monomer mixes were loaded into the cure tunnel. Once the tunnel was full, the machine was completely stopped and pallets for each row were removed out of the tunnel and labeled with their location. The location of the pallet corresponds to the amount of light the lens was exposed to in the process. This process was repeated until the desired amount of samples was collected for each of the monomers mixtures and light intensities tested. The results are depicted in FIGS. 8A and 8B.

Example 11

The photo-polymerization reaction for each of the Formulation C, listed in Table 2, was monitored with an ATS StressTech rheometer (ATS RheoSystems, 52 Georgetown Road, Bordentown, N.J. 08505) equipped with a photo-curing accessory, which consisted of a temperature-controlled cell with a quartz lower plate and an aluminum upper plate, and an OmniCure mercury arc lamp (EXFO Photonic Solutions Inc., 2260 Argentia Rd., Mississauga, ON L5N 6H7 CANADA) with a band pass filter (Andover Corporation, 4 Commercial Drive, Salem, N.H. 03079-2800 USA) situated beneath the quartz plate. The intensity of the radiation, measured at the surface of the quartz window with an IL1400A radiometer and XRL140A sensor (International Light, Inc., 17 Graf Road, Newburyport, Mass. 01950), was regulated at 4.5±0.5 mW/cm$^2$. The temperature was controlled at 60.0±0.1° C.

After approximately 0.25 mL of the reactive monomer mix was placed on the lower plate of the rheometer, the 25 mm diameter upper plate was lowered to 0.500±0.001 mm above the lower plate, where it was held until after the reaction reached the gel point. The sample was allowed to reach thermal equilibrium (~5 minutes, determined by the leveling-off of the steady shear viscosity of the sample as it warmed up) before the OmniCure was turned on and the reaction begun. During this time, while the sample was reaching thermal equilibrium, the sample chamber was purged with nitrogen gas at a rate of 400 sccm. After this initial purge the oxygen level in the sample chamber was monitored at 0.5±0.1% with a CheckPoint O$_2$ sensor (PBI Dansensor, available from Topac, 101 Derby St., #203 Hingham, Mass. 02043). During the reaction the rheometer continuously monitored the strain resulting from an applied dynamic stress (fast oscillation mode), where time segments of less than a complete cycle were used to measure the strain at the applied sinusoidal stress (applied at a frequency of 1.0 Hz). The dynamic shear modulus (G'), loss modulus (G"), and gap height were monitored as a function of exposure time. As the reaction proceeded the shear modulus increased from <1 Pa to >0.1 MPa, and tan δ(=G"/G') dropped from near infinity to less than 1. For many reactive crosslinking systems the gel point is defined as the time at which tan δ=1 (the crossover point when G'=G"). At the time that G' reached 100 Pa (shortly after the gel point), the restriction of the gap height on the upper plate was removed (Autotension Mode: Tension=0) so that the gap between the upper and lower plates could change as the reactive monomer mix shrank during cure, and the stress due to shrinkage was kept at a minimum. A measurement of the change in gap provides an estimate of the amount of shrinkage caused by the polymerization reaction. After a 10-minute exposure the OmniCure was turned off (i.e., the cure was terminated).

The results are shown in FIGS. 9-11, which show the gel point and time to 95% conversion differences between lenses made with the same initiator, but varying filters and photochromic dye concentrations. As can be seen by comparing FIGS. 9B, 10B and 11B, which show the modulus builds for the various polymers made in Example 11 (G' v. time), when filters are used which block wavelengths where the photochromic dye displays absorbance, the efficiency of conversion is improved.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A process for manufacturing a contact lens comprising at least one photochromic compound consisting essentially of the steps of:
   selecting a photoinitiator which absorbs at a first wavelength;
   selecting a photochromic dye which displays substantial absorption at the first wavelength when the dye is at a first temperature and but is in an inactivated state at a second temperature;
   dispensing a reaction mixture into a mold, the mixture comprising at least one polymerizable monomer, the photoinitiator and the photochromic compound;
   warming the reaction mixture to said second temperature, to maintain the photochromic compound in the inactivated state at the first wavelength;
   curing the reaction mixture at said second temperature to form a photochromic contact lens by exposing the mixture to radiation that include the first wavelength.

2. The process as recited in claim 1, wherein the first temperature is about 25° C. and the second temperature is at least about 40° C.

3. The process as recited in claim 1, wherein the photochromic compound is a polymerizable photochromic dye that copolymerizes with the at least one polymerizable monomer during the step of curing the mixture.

4. The process as recited in claim 1, wherein the photochromic compound is homogeneously dispersed throughout the contact lens.

5. The process as recited in claim 1, wherein the photochromic compound is disposed in a central circular area having a diameter of about 1 to about 9 mm centered at a geometric center of the contact lens and the central circular area is surrounded by a region that is substantially free of the photochromic dye, thus forming a pupil-only contact lens.

6. The process as recited in claim 1, wherein the first wavelength is between 380 nm to 780 nm.

7. The process as recited in claim 1, wherein the first wavelength is between 400 nm to 500 nm.

8. The process as recited in claim 1, wherein the first wavelength is between 420 nm to 480 nm.

9. The process as recited in claim 1, wherein the temperature of the warming step is between 55° C. and 75° C.

10. The process as recited in claim 1, wherein the temperature of the warming step between 60° C. and 70° C.

11. The process of claim 1 wherein said mold is exposed to radiation from a top and bottom side of the mold.

12. The process of claim 1 wherein said radiation is balanced from the top and bottom sides of the mold.

13. The process of claim 1 wherein said curing step further comprises filtering out wavelengths outside the range of about 400 nm to about 420 nm.

14. The process of claim 1 wherein said curing step further comprises filtering out wavelengths outside the range of about 420 to about 440 nm.

15. The process of claim 1 wherein said radiation is provided by light emitting diodes.

16. The process of claim 1 wherein said radiation omits at least a portion of the wavelengths absorbed by the photochromic compound in the inactivated state.

17. The process of claim 1 wherein said radiation omits all the wavelengths absorbed by the photochromic compound in the inactivated state.

\* \* \* \* \*